(12) United States Patent
Sakurai et al.

(10) Patent No.: US 9,016,637 B2
(45) Date of Patent: Apr. 28, 2015

(54) HIGH-POSITIONED 3-POSITION VARIABLE CAMBER KRUEGER

(75) Inventors: Seiya Sakurai, Seattle, WA (US); Stephen J. Fox, Everett, WA (US); Victor Reyes, Mukilteo, WA (US); Kara Marie Charles, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 400 days.

(21) Appl. No.: 13/370,314

(22) Filed: Feb. 10, 2012

(65) Prior Publication Data

US 2013/0206917 A1  Aug. 15, 2013

(51) Int. Cl.
*B64C 3/50* (2006.01)
*B64C 9/22* (2006.01)
*B64C 9/24* (2006.01)

(52) U.S. Cl.
CPC .... *B64C 9/22* (2013.01); *B64C 9/24* (2013.01)

(58) Field of Classification Search
USPC .................................................. 244/214, 99.3
See application file for complete search history.

(56) References Cited

U.S. PATENT DOCUMENTS

| 4,189,121 A | 2/1980 | Harper et al. |
| 4,262,868 A | 4/1981 | Dean |
| 5,158,252 A | 10/1992 | Sakurai |
| 7,578,484 B2 | 8/2009 | Fox et al. |
| 2006/0102803 A1 | 5/2006 | Wheaton et al. |

FOREIGN PATENT DOCUMENTS

WO    2008051286 A2    5/2008

OTHER PUBLICATIONS

Extended European Search Report 2193411.1 and Written Opinion dated Aug. 7, 2014.

*Primary Examiner* — Tien Dinh
*Assistant Examiner* — Vicente Rodriguez
(74) *Attorney, Agent, or Firm* — Ameh IP; Lowell Campbell; Elahe Toosi

(57) ABSTRACT

A system and method to enable natural laminar flow over a fluid-dynamic body using a variable camber Krueger flap is disclosed. A sequence of flap positions is deployed where the variable camber Krueger flap is below and aft of the wing leading edge before reaching a configured takeoff and landing position. The variable camber Krueger flap is positioned in a high position relative to a wing leading edge when the variable camber Krueger flap is fully deployed.

17 Claims, 7 Drawing Sheets

HIGH-POSITIONED 3-POSITION VARIABLE CAMBER KRUEGER

FIELD

Embodiments of the present disclosure relate generally to fluid-dynamic design. More particularly, embodiments of the present disclosure relate to design of fluid-dynamic control surfaces.

BACKGROUND

In aeronautics and aeronautical engineering, a Krueger flap is generally a wing leading edge device that provides high-lift capability. A camber of a Krueger flap may comprise an asymmetry between an upper surface and a lower surface of an airfoil of the Krueger flap. A camber of an airfoil can be defined by a camber line, which is a curve that is halfway between the upper surface and the lower surface of the airfoil. Camber is generally an important contributing factor determining a stall speed of an aircraft. A change in a camber of an airfoil can change a stall speed of an aircraft.

SUMMARY

A system and method to enable natural laminar flow over a fluid-dynamic body using a variable camber Krueger flap is disclosed. A sequence of flap positions is deployed where the variable camber Krueger flap is below and aft of a wing leading edge before reaching a configured takeoff and landing position. The variable camber Krueger flap is positioned in a high position relative to the wing leading edge when the variable camber Krueger flap is fully deployed.

In this manner, embodiments of the discloser provide a high-positioned three-position variable camber Krueger flap that provides high-lift capability and bug shielding to enable natural laminar flow.

In an embodiment, a flap deployment linkage mechanism comprises a first linkage assembly and a second linkage assembly. The first linkage assembly is operable to couple to a flap assembly and an airfoil, and comprises a first drive arm, a first drive link, and a support arm. The first drive arm is coupled to the airfoil, and rotates in a chord-wise plane. The first drive link is coupled to the first drive arm and a trailing end of the flap assembly. The support arm is coupled to a middle link portion of the first drive link and is rotatably coupled to the airfoil at a common joint. The second linkage assembly is operable to couple to the flap assembly and the airfoil, and comprises a second drive arm, a rotation control arm, a drive transfer arm, and a second drive link. The second drive arm is rotatably coupled to the first drive arm. The rotation control arm is coupled to the second drive arm and the airfoil, and operable to control a rotation of the second drive arm. The drive transfer arm is coupled to a middle flap portion of the flap assembly and rotatably coupled to the airfoil at the common joint. The second drive link is rotatably coupled to a middle transfer arm portion of the drive transfer arm and to the second drive arm.

In another embodiment, a method to enable natural laminar flow over a fluid-dynamic body using a variable camber Krueger flap deploys a sequence of flap positions where the variable camber Krueger flap is below and aft of a wing leading edge before reaching a configured takeoff and landing position. The method further positions the variable camber Krueger flap in a high position relative to the wing leading edge when the variable camber Krueger flap is fully deployed.

In a further embodiment, a flap linkage assembly is operable to couple to a flap comprising a bullnose member, a trailing end member, and a flexible surface coupled between the bullnose member and the trailing end member. The flap linkage assembly comprises a flap link, a bullnose link, and a rotation arm link. The flap link coupled to the bullnose member, the trailing end member, and the first drive link. The bullnose link coupled to the bullnose member and the first drive link. The rotation arm link coupled to the rotation arm, the trailing end member.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, vehicle structures, fluid dynamics, flight control systems, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, an aircraft Krueger flap. Embodiments of the disclosure, however, are not limited to such aircraft Krueger flap applications, and the techniques described herein may also be utilized in other applications. For example but without limitation, embodiments may be applicable to hydrofoils, wind turbines, tidal power turbines, or other fluid dynamic surface.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
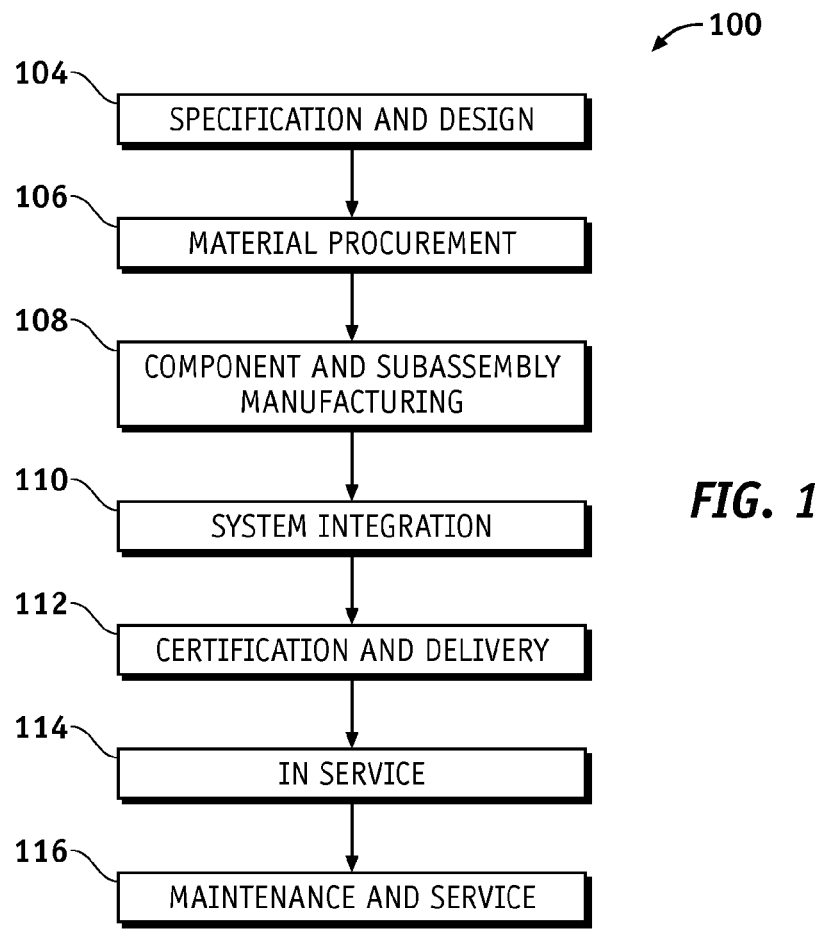
FIG. 1 is an illustration of a flow diagram of an exemplary aircraft production and service methodology.
Figure 2:
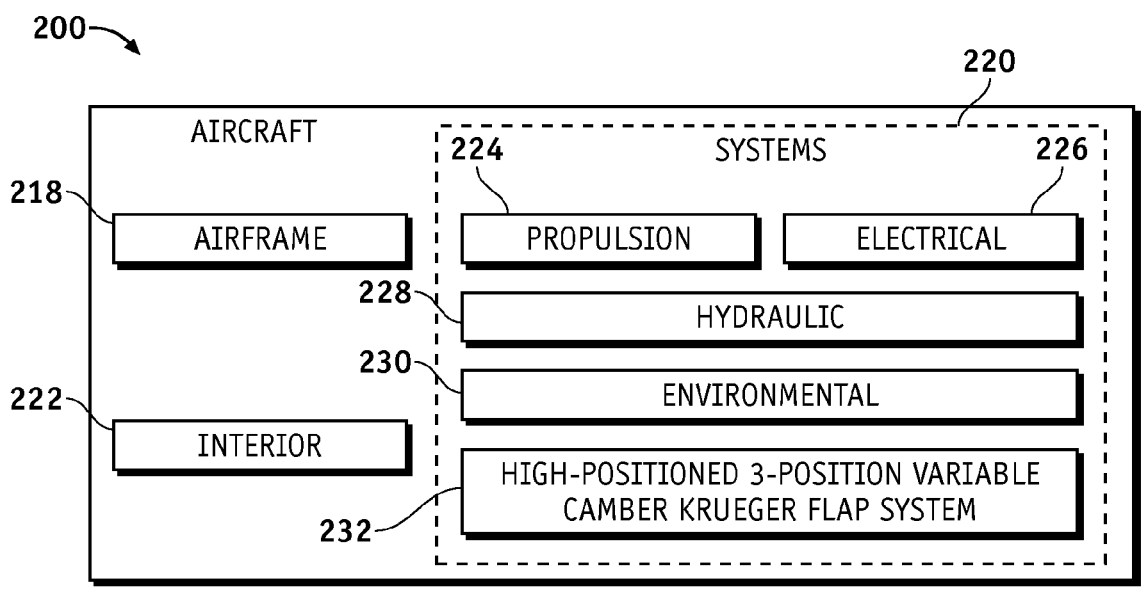
FIG. 2 is an illustration of an exemplary block diagram of an aircraft.

Referring more particularly to the drawings, embodiments of the disclosure may be described in the context of an exemplary aircraft manufacturing and service method 100 (method 100) as shown in FIG. 1 and an aircraft 200 as shown in FIG. 2. During pre-production, the method 100 may comprise specification and design 104 of the aircraft 200, and material procurement 106. During production, component and subassembly manufacturing 108 (process 108) and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also comprise modification, reconfiguration, refurbishment, and so on).

Each of the processes of method 100 may be performed or carried out by a system integrator, a third party, and/or an operator (e.g., a customer). For the purposes of this description, a system integrator may comprise, for example but without limitation, any number of aircraft manufacturers and major-system subcontractors; a third party may comprise, for example but without limitation, any number of vendors, subcontractors, and suppliers; and an operator may comprise, for example but without limitation, an airline, leasing company, military entity, service organization; and the like.

As shown in FIG. 1, the aircraft 200 produced by the method 100 may comprise an airframe 218 with a plurality of systems 220 and an interior 222. Examples of high-level systems of the systems 220 comprise one or more of a propulsion system 224, an electrical system 226, a hydraulic system 228, an environmental system 230, and a high-positioned 3-position variable camber Krueger flap system 232. Any number of other systems may also be included. Although an aerospace example is shown, the embodiments of the disclosure may be applied to other industries.

Apparatus and methods embodied herein may be employed during any one or more of the stages of the method 100. For example, components or subassemblies corresponding to production of the process 108 may be fabricated or manufactured in a manner similar to components or subassemblies produced while the aircraft 200 is in service. In addition, one or more apparatus embodiments, method embodiments, or a combination thereof may be utilized during production stages of the process 108 and the system integration 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Embodiments of the discloser provide a high-positioned 3-position variable camber Krueger flap that provides high-lift capability and bug shielding to enable natural laminar flow. The Krueger flap is positioned high, relative to the wing, in the airplane takeoff and landing positions. During deployment, the Krueger flap avoids transition stalls. The linkage arrangement positions the Krueger flap high, relative to the wing, to enable natural laminar flow.

Figure 3:
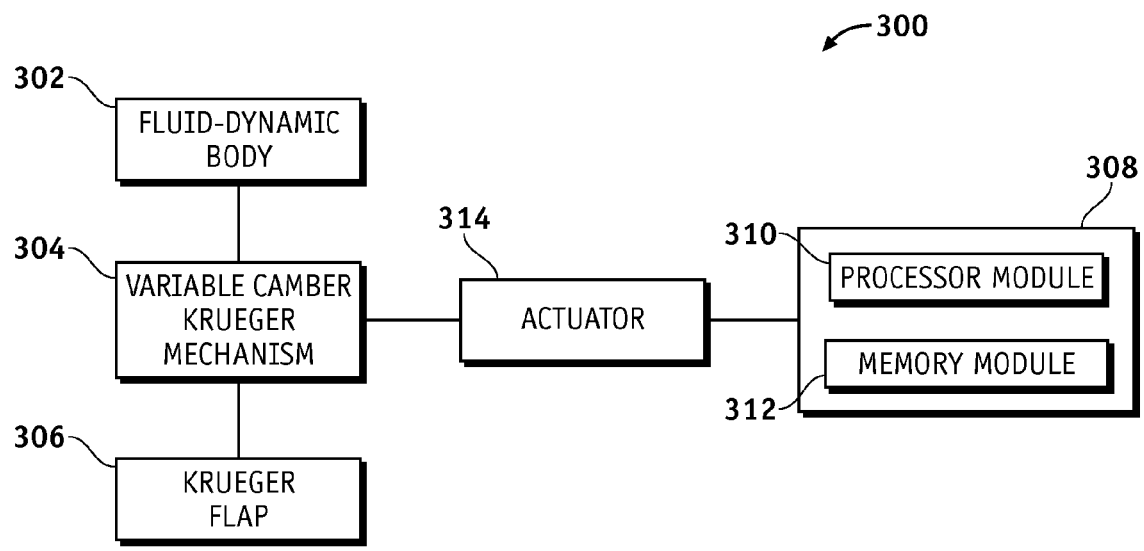
FIG. 3 is an illustration of an exemplary variable camber fluid-dynamic body system according to an embodiment of the disclosure.

FIG. 3 is an illustration of an exemplary variable camber fluid-dynamic body system 300 (system 300) according to an embodiment of the disclosure. The system 300 may comprise, a fluid-dynamic body 302 (airfoil 302), a variable camber Krueger mechanism 304, a Krueger flap 306, an actuator 314, and a controller 308.

The airfoil 302 comprises a variable camber resulting from deployment of the Krueger flap 306 by the variable camber Krueger mechanism 304. The airfoil 302 may comprise a lifting surface and/or a control surface of a fluid-dynamic body (e.g., an aerodynamic body 504 shown in cross section in FIG. 5). The lifting surface may comprise, for example but without limitation, a wing, a canard, a horizontal stabilizer, or other lifting surface. The control surface may comprise, for example but without limitation, a slat, an aileron, a tail, a rudder, an elevator, a flap, a spoiler, an elevon, or other control surface.

The Krueger flap 306 changes a camber of the airfoil 302 when the Krueger flap 306 is deployed by the variable camber Krueger mechanism 304. Furthermore, a camber of the Krueger flap 306 may change during deployment of the Krueger flap 306 by the variable camber Krueger mechanism 304. Krueger flap 306 and variable camber Krueger flap 306 may be used interchangeably in this document. The variable camber Krueger flap 306 may comprise, for example but without limitation, a flap link 572, a bullnose link 574, and a transfer arm link 576 (FIG. 5), or other flap component. The variable camber Krueger flap 306 may be operable to change camber in response to control from the variable camber Krueger mechanism 304.

The airfoil 302 is operable to configure a shape of a camber 414 (FIG. 4) to a first camber configuration using the variable camber Krueger mechanism 304 to deploy the Krueger flap 306 at a first camber position in response to a first control actuation command. The airfoil 302 is further operable to configure a shape of the camber 414 (FIG. 4) to reshape the first camber configuration to a second camber configuration using the variable camber Krueger mechanism 304 to deploy the Krueger flap 306 at a second camber position in response to a second control actuation command by the actuator 314. In this manner, a camber profile of the airfoil 302 changes from a fixed camber profile prior to an actuation of the variable camber Krueger mechanism 304 to a variable camber profile after the actuation of the variable camber Krueger mechanism

304. The camber 414 (FIG. 4) of the airfoil 302 may be defined by a mean camber line 410 (FIG. 4), which is the curve that is halfway between an upper surface 420 (FIG. 4) and a lower surface 422 (FIG. 4) of the airfoil 302 (airfoil 400 in FIG. 4). As mentioned above, a change in the camber 414 of the airfoil 302/400 can change a stall speed of the aircraft 200.

The variable camber Krueger mechanism 304 is operable to vary a shape (i.e., bend, deflect, change shape) of a camber in response to an actuation command. In this manner, the camber 414 can change shape to alter a flow over the airfoil 302/400. In one embodiment, the variable camber Krueger mechanism 304 may be made from a shape memory alloy material and be controlled via a passive control mechanism to control the shape of the camber 414 based on an ambient temperature corresponding to an altitude at a flight condition. In another embodiment, the controller 308 may include or be realized as a controller (connected to the aircraft systems), to facilitate controlling a change in the shape of the camber 414. The variable camber Krueger mechanism 304 according to various embodiments is discussed in more detail below in the context of discussion of FIGS. 5-8.

The controller 308 may comprise, for example but without limitation, a processor module 310, a memory module 312, or other module. The controller 308 may be implemented as, for example but without limitation, a part of an aircraft system, a centralized aircraft processor, a subsystem computing module comprising hardware and software devoted to the variable camber Krueger mechanism 304, or other processor.

The controller 308 is configured to control the variable camber Krueger mechanism 304 to vary a shape of the camber 414 according to various operation conditions. The operation conditions may comprise, for example but without limitation, flight conditions, ground operations, and the like. The flight conditions may comprise, for example but without limitation, take off, cruise, approach, landing, and the like. The ground operations may comprise, for example but without limitation, air breaking after landing, or other ground operation. The controller 308, may be located remotely from the variable camber Krueger mechanism 304, or may be coupled to the variable camber Krueger mechanism 304.

In operation, the controller 308 may control the variable camber Krueger mechanism 304 by sending actuation commands from the actuator 314 to the variable camber Krueger mechanism 304, thereby moving the variable camber Krueger flap 306.

The processor module 310 comprises processing logic that is configured to carry out the functions, techniques, and processing tasks associated with the operation of the system 300. In particular, the processing logic is configured to support the system 300 described herein. For example, the processor module 310 may direct the variable camber Krueger mechanism 304 to vary a shape of the camber 414 by moving the variable camber Krueger flap 306 based on various flight conditions.

The processor module 310 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 312 may comprise a data storage area with memory formatted to support the operation of the system 300. The memory module 312 is configured to store, maintain, and provide data as needed to support the functionality of the system 300. For example, the memory module 312 may store flight configuration data, control temperature data, or other data.

In practical embodiments, the memory module 312 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 312 may be coupled to the processor module 310 and configured to store, for example but without limitation, a database, and the like. Additionally, the memory module 312 may represent a dynamically updating database containing a table for updating the database, and the like. The memory module 312 may also store, a computer program that is executed by the processor module 310, an operating system, an application program, tentative data used in executing a program, or other application.

The memory module 312 may be coupled to the processor module 310 such that the processor module 310 can read information from and write information to the memory module 312. For example, the processor module 310 may access the memory module 312 to access an aircraft speed, a flight control surface position, an angle of attack, a Mach number, an altitude, or other data.

As an example, the processor module 310 and memory module 312 may reside in respective application specific integrated circuits (ASICs). The memory module 312 may also be integrated into the processor module 310. In an embodiment, the memory module 312 may comprise a cache memory for storing temporary variables or other intermediate information during execution of instructions to be executed by the processor module 310.

Figure 4:
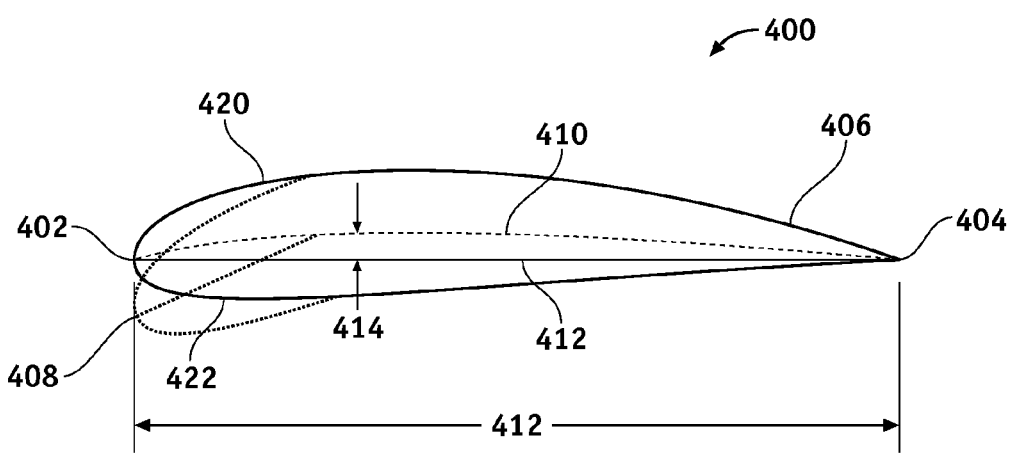
FIG. 4 is an illustration of an exemplary airfoil with variable camber according to an embodiment of the disclosure.

FIG. 4 is an illustration of an exemplary airfoil 400 with variable camber according to an embodiment of the disclosure. The airfoil 400 may comprise a leading edge 402, a trailing edge 404, the upper surface 420, and the lower surface 422. The airfoil 400 changes the camber 414 in response to control from the variable camber Krueger mechanism 304 (FIG. 3). As explained in more detail below, the variable camber Krueger mechanism 304 may be coupled in various ways to the airfoil 400. The variable camber Krueger mechanism 304 may configure the airfoil 400 into a first camber configuration 406 and a second camber configuration 408 by deploying the Krueger flap 306 at desired camber positions as explained below. The first camber configuration 406 may comprise, for example but without limitation, a stowed position, a barndoor position, a landing position, a take-off position, or other camber configuration. The second camber configuration 408 may comprise, for example but without limitation, a stowed position, a barndoor position, a landing position, a take-off position, or other camber configuration.

The airfoil 400 may be characterized by the mean camber line 410 (camber line) and a chord line 412. The camber line 410 may comprise a curve halfway between the upper surface 420 and the lower upper surface 422 of the airfoil 400 characterizing an asymmetry between the upper surface 420 and the lower surface 422. The camber 414 of the airfoil 400 can be defined by a camber line 410. The camber 414 may comprise distances between the camber line 410 and the chord line 412 defining a shape of the camber line 410.

Figure 5:
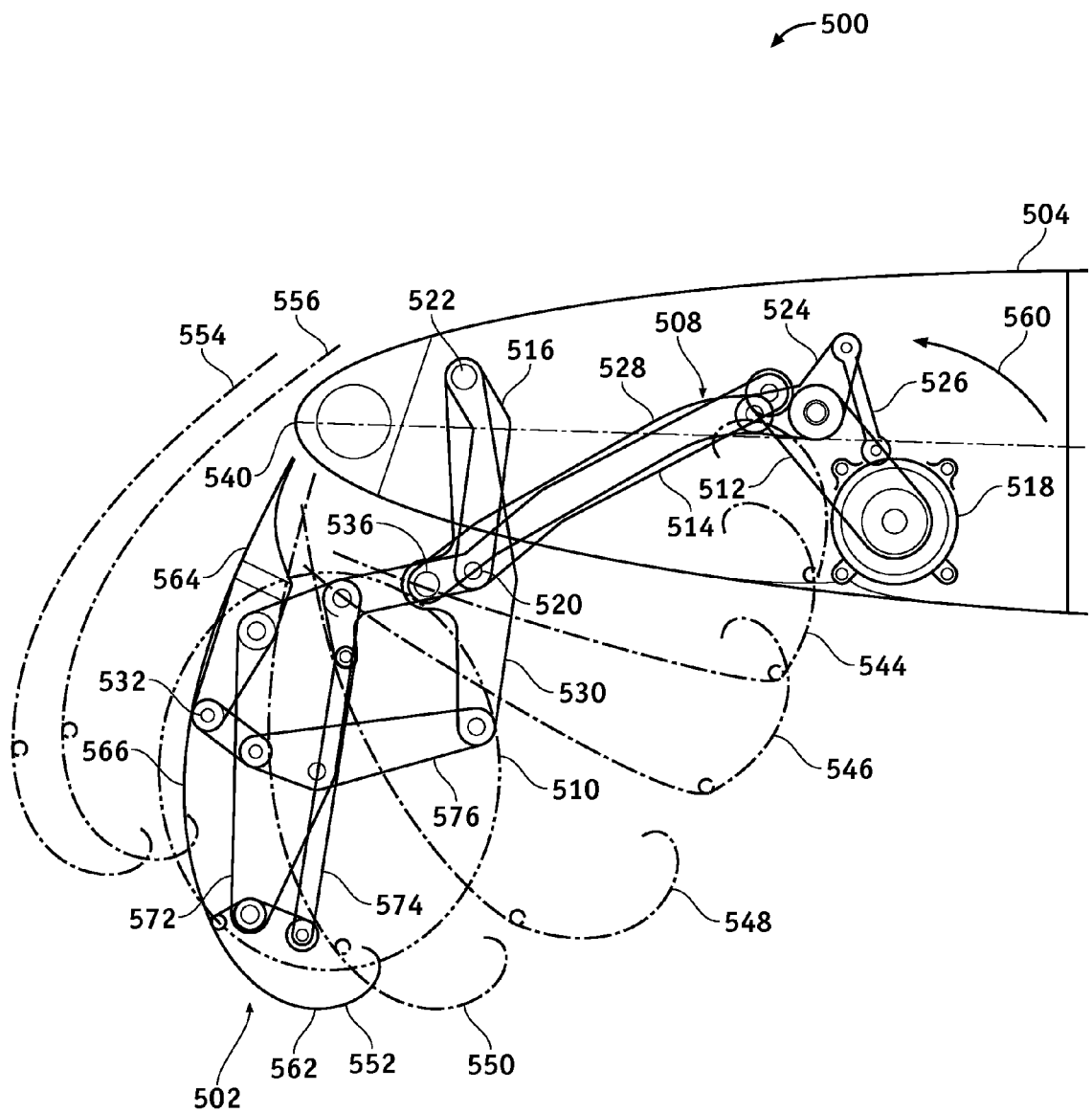
FIG. 5 is an illustration of an exemplary cross-sectional view of a variable camber Krueger flap mechanism according to an embodiment of the disclosure.

FIG. 5 is an illustration of an exemplary cross-sectional view of a variable camber Krueger flap mechanism 500 (304 in FIG. 3) (flap deployment linkage mechanism 500) according to an embodiment of the disclosure. The flap deployment linkage mechanism 500 is coupled to a flap assembly 502 and an aerodynamic body 504 (airfoil 302/400). The variable camber Krueger flap mechanism 500 comprises a combined single joint such as a common joint 522 for deploying the variable camber Krueger flap 306 (flap assembly 502). In this manner, two joints in the variable camber Krueger flap mechanism 500 may be combined into a single location to form the common joint 522.

The flap assembly 502 (variable camber Krueger flap 306 in FIG. 3) may comprise a bullnose member 562, a trailing end member 564, and a flexible surface 566 coupled between the bullnose member 562 and the trailing end member 564. In some embodiments, a camber (curvature) of the flap assembly 502 may be changed in response to a change in position of the bullnose member 562, the trailing end member 564, and the flexible surface 566.

The flap assembly 502 may be deployed by the flap deployment linkage mechanism 500 from the aerodynamic body 504 through a plurality of positions 542-556. The positions 542-556 may begin deployment at a stowed position 542, and move through intermediate positions 544-550 to a deployed position. The deployed position may comprise, for example but without limitation, a barndoor position 552 (also shown in FIG. 6), a landing position 554 (also shown in FIG. 7), a take-off position 556 (also shown in FIG. 8), or other deployed position. The flap deployment linkage mechanism 500 may comprise a first linkage assembly 506, a second linkage assembly 508, and a flap linkage assembly 510.

The first linkage assembly 506 is operable to couple to the flap assembly 502 (e.g., through the flap linkage assembly 510) and the aerodynamic body 504. The first linkage assembly 506 comprises a first drive arm 512, a first drive link 514, and a support arm 516. The first drive arm 512 is coupled to the aerodynamic body 504, and operable to rotate in a chordwise rotational plane 560 when driven by the actuator 518. The first drive link 514 is coupled to the first drive arm 512 and the trailing end member 564 (e.g., via the flap link 572) of the flap assembly 502. The support arm 516 is coupled to a middle link portion 520 of the first drive link 514 and rotatably coupled to the aerodynamic body 504 at the common joint 522. In this manner, two joints in the variable camber Krueger flap mechanism 500 may be combined into a single location as explained above.

The second linkage assembly 508 is operable to couple to the flap assembly 502 (e.g., through the flap linkage assembly 510) and the aerodynamic body 504. The second linkage assembly 508 comprises a second drive arm 524, a rotation control arm 526, a second drive link 528, and a drive transfer arm 530. The second drive arm 524 rotatably is coupled to the first drive arm 512. The rotation control arm 526 is coupled to the second drive arm 524 and the aerodynamic body 504, and is operable to control a rotation of the second drive arm 524. The drive transfer arm 530 is coupled to a middle flap portion 532 of the flap assembly 502 and is rotatably coupled to the aerodynamic body 504 at the common joint 522. The second drive link 528 is rotatably coupled to a middle transfer arm portion 536 of the drive transfer arm 530 and to the second drive arm 524.

The flap linkage assembly 510 is operable to couple to the flap assembly 502. The flap linkage assembly 510 comprises the flap link 572, the bullnose link 574, and the transfer arm link 576. The flap link 572 is coupled to the bullnose member 562, the trailing end member 564, and the first drive link 514. The bullnose link 574 is coupled to the bullnose member 562 and the first drive link 514. The transfer arm link 576 is coupled to the drive transfer arm 530, and the trailing end member 564.

Figure 6:
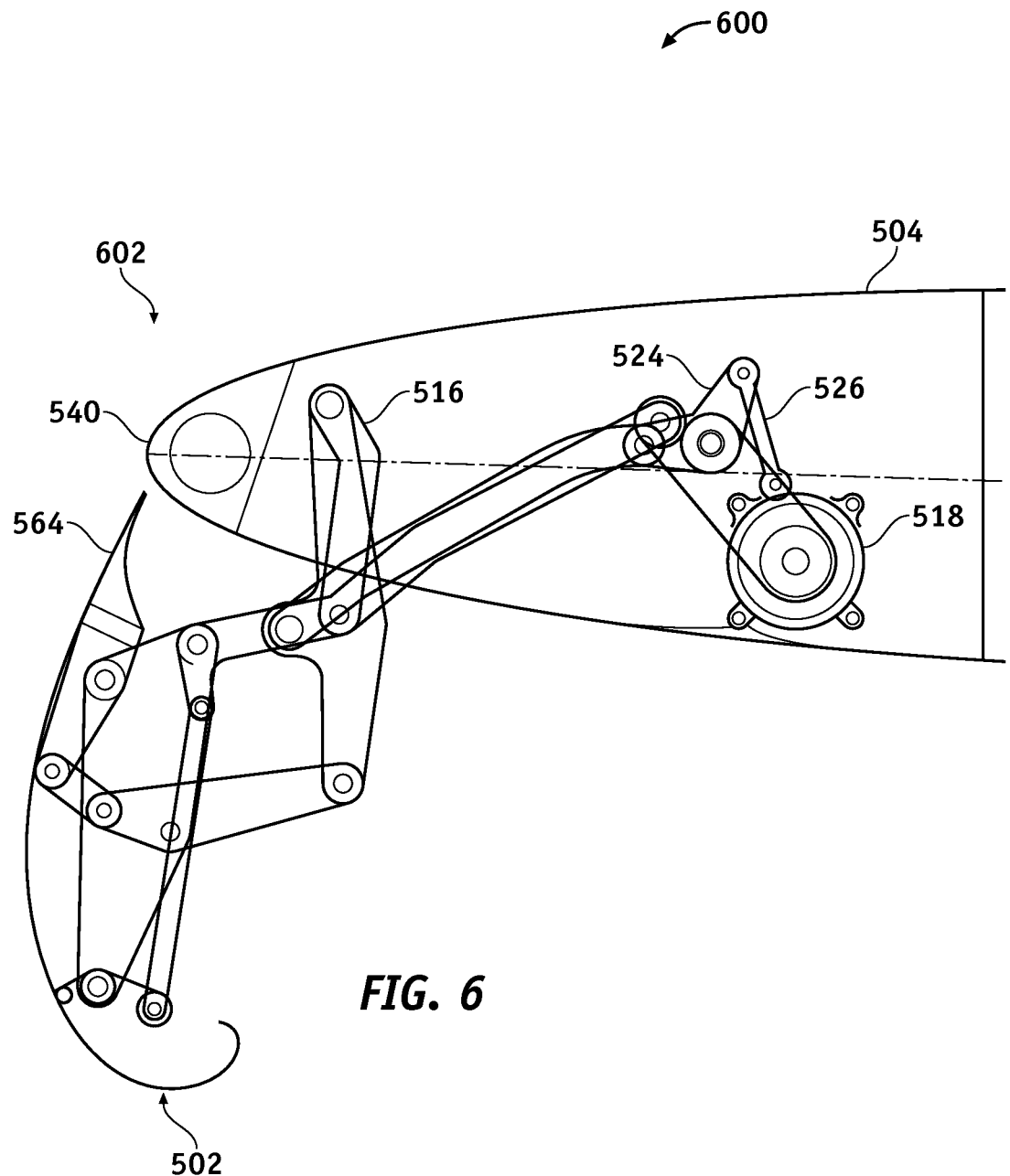
FIG. 6 is an illustration of an exemplary cross-sectional view of the variable camber Krueger flap mechanism of FIG. 5 in a barndoor position according to an embodiment of the disclosure.

FIG. 6 is an illustration of an exemplary cross-sectional view 600 of a variable camber Krueger flap mechanism 500 of FIG. 5 in a barndoor position 602 according to an embodiment of the disclosure. The barndoor position 602 is an in-transit position, as the variable camber Krueger flap 306 is being deployed to landing/takeoff detents. The barndoor position is an aerodynamically favorable position. In this position, and in other deployed positions, the variable camber Krueger flap mechanism 500 can be subject to high loads generated by aerodynamic forces acting on the flap assembly 502. The variable camber Krueger flap mechanism 500 can be configured to efficiently transmit aerodynamic loads to the aerodynamic body 504. The variable camber Krueger flap mechanism 500 can transmit loads generally in compression or tension, without incurring significant bending loads. However, some joints such the first drive link 514 and the drive transfer arm 530 may have bending loads.

Figure 7:
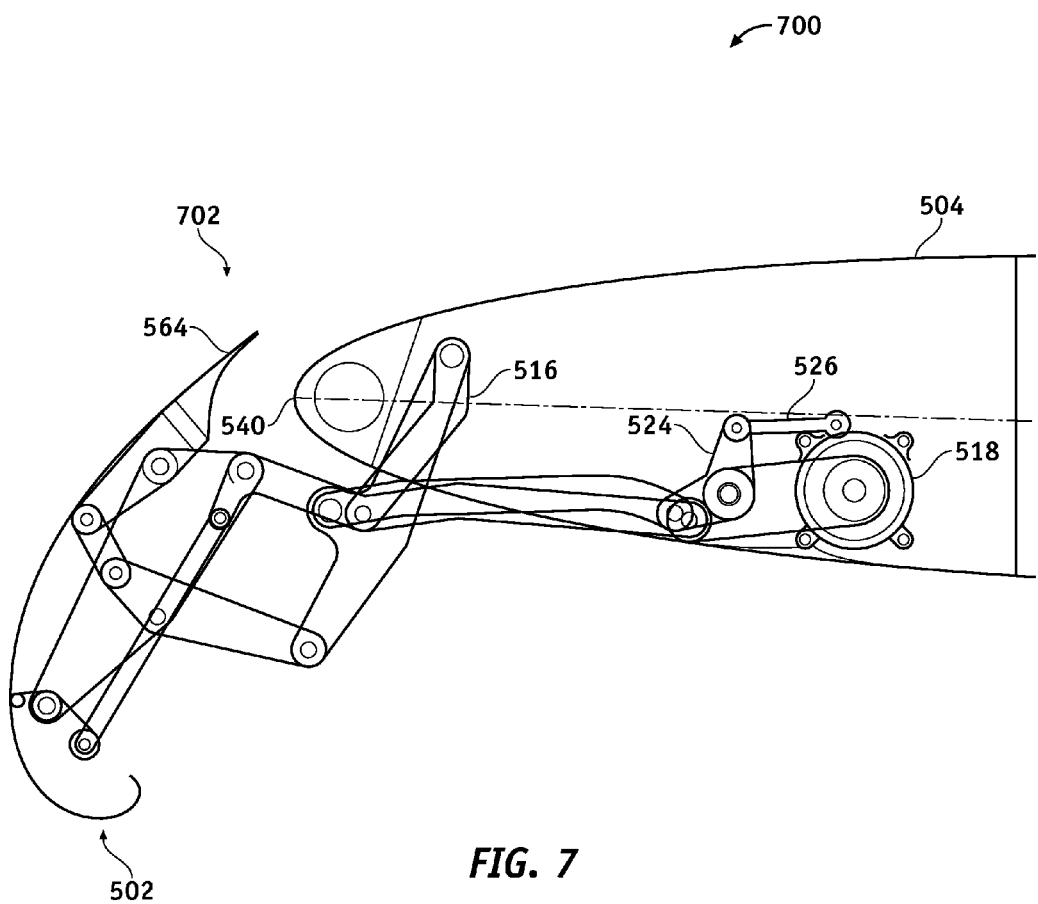
FIG. 7 is an illustration of an exemplary cross-sectional view of the variable camber Krueger flap mechanism of FIG. 5 in a landing position according to an embodiment of the disclosure.

FIG. 7 is an illustration of an exemplary cross-sectional view 700 of a variable camber Krueger flap mechanism 500 of FIG. 5 in a landing position 702 according to an embodiment of the disclosure. The flap assembly 502 Krueger flap 306) is positioned in an elevated position relative to the aerodynamic body 504 (airfoil 302 in FIG. 3) sufficient to provide foreign object deflection protection for the airfoil 302.

Figure 8:
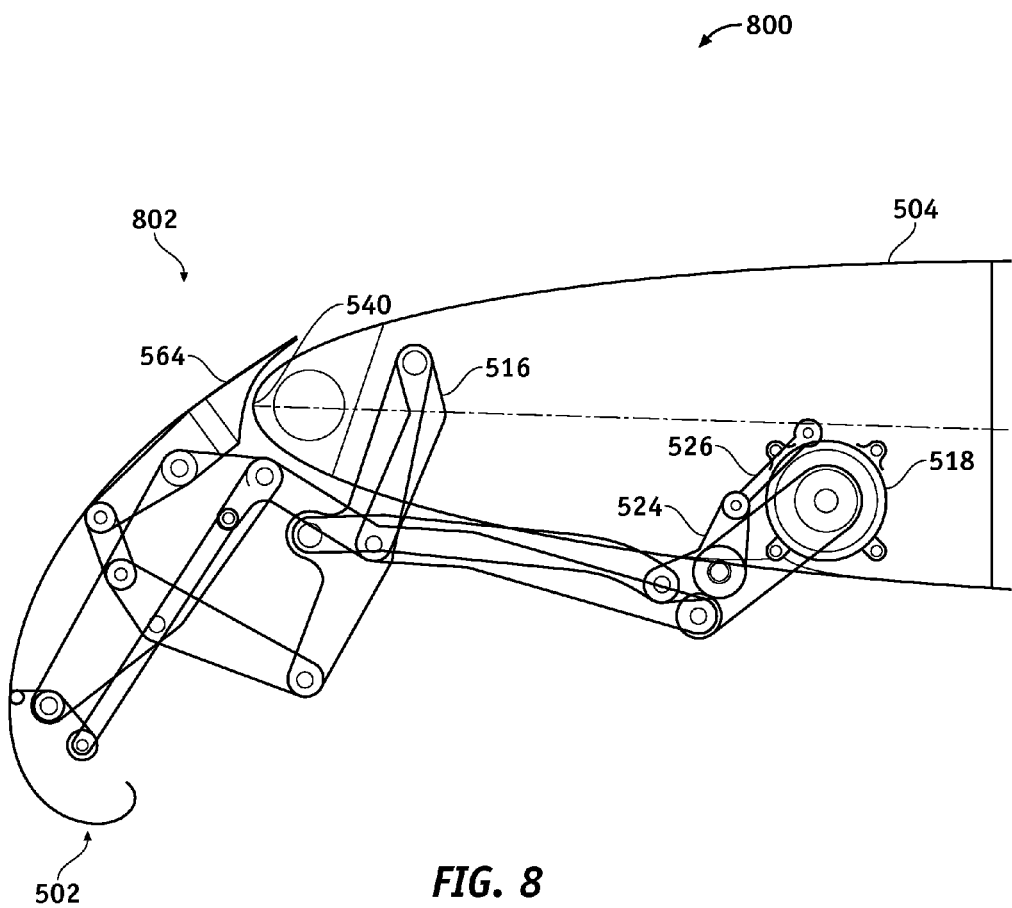
FIG. 8 is an illustration of an exemplary cross-sectional view of the variable camber Krueger flap mechanism of FIG. 5 in a take-off position according to an embodiment of the disclosure.

FIG. 8 is an illustration of an exemplary cross-sectional view 800 of a variable camber Krueger flap mechanism 500 of FIG. 5 in a take-off position 802 according to an embodiment of the disclosure. The flap assembly 502 is positioned in an elevated position relative to the aerodynamic body 504 (airfoil 302 in FIG. 3) sufficient to provide foreign object deflection protection for the airfoil 302.

Figure 9:
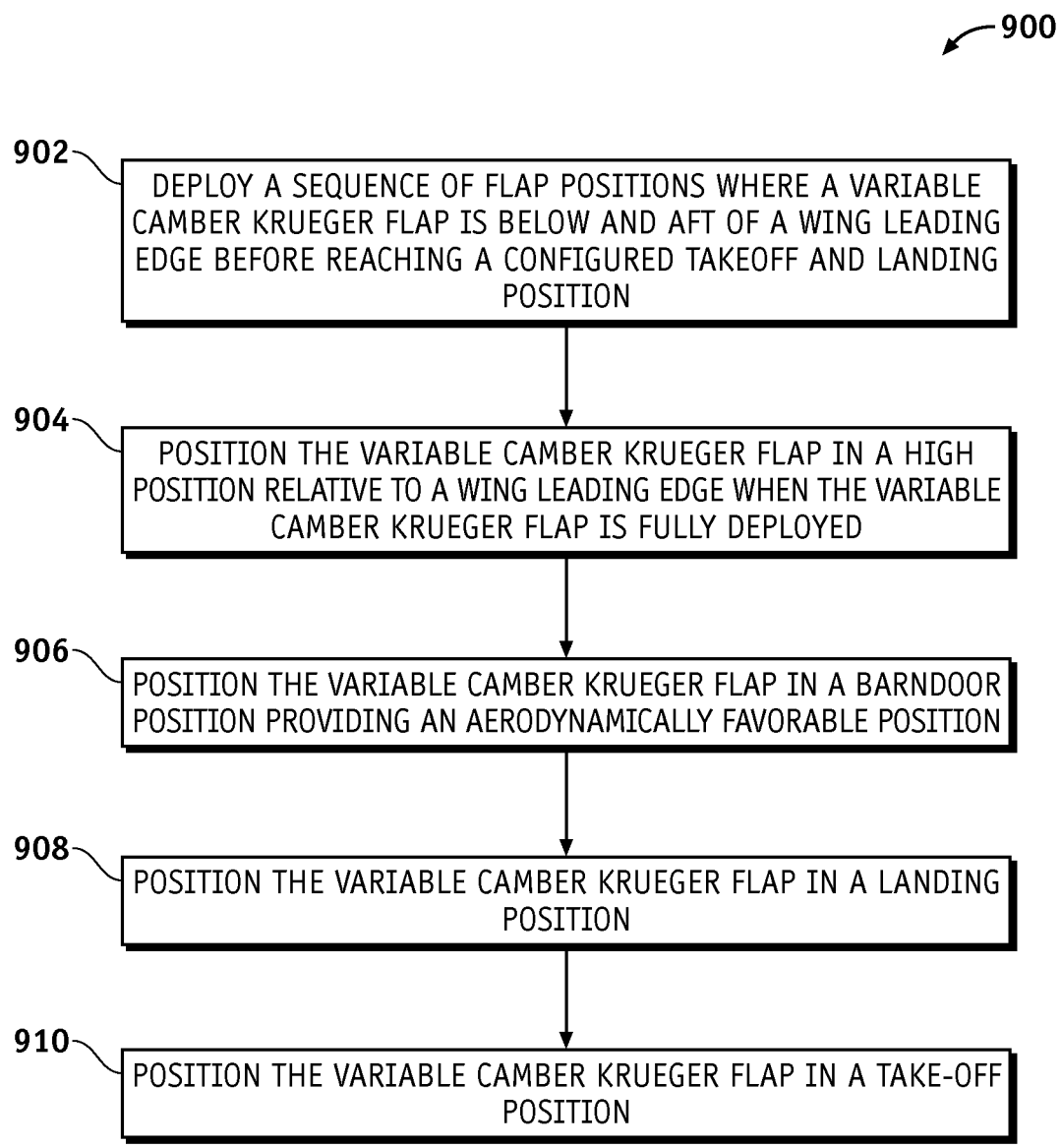
FIG. 9 is an illustration of an exemplary flowchart showing a process for providing a variable camber fluid-dynamic body system according to an embodiment of the disclosure.

FIG. 9 is an illustration of an exemplary flowchart showing a process 900 (process 900) for providing a variable camber Krueger flap system according to an embodiment of the disclosure. The various tasks performed in connection with process 900 may be performed mechanically, by software, hardware, firmware, computer-readable software, computer readable storage medium, or any combination thereof. It should be appreciated that process 900 may include any number of additional or alternative tasks, the tasks shown in FIG. 9 need not be performed in the illustrated order, and the process 900 may be incorporated into a more comprehensive procedure or process having additional functionality not described in detail herein.

For illustrative purposes, the following description of process 900 may refer to elements mentioned above in connection with FIGS. 1-8. In practical embodiments, portions of the process 900 may be performed by different elements of the system 300 such as: the fluid-dynamic body 302, the variable camber Krueger mechanism 304, the controller 308, etc. It should be appreciated that process 900 may include any number of additional or alternative tasks, the tasks shown in FIG. 9 need not be performed in the illustrated order, and the process 900 may be incorporated into a more comprehensive procedure or process having additional functionality not described in detail herein.

Process 900 may begin by the variable camber Krueger flap mechanism 500 deploying a sequence of flap positions where a variable camber Krueger flap such as the variable camber Krueger flap 306 (flap assembly 502) is below and aft of a wing leading edge such as the wing leading edge 540 before reaching a configured takeoff and landing position (task 902).

Process 900 may continue by the variable camber Krueger flap mechanism 500 positioning the variable camber Krueger flap 306 in a high position relative to the wing leading edge 540 when the variable camber Krueger flap 306 is fully deployed (task 904). The fully deployed position may be at the position 556 in FIG. 5.

Process 900 may continue by the variable camber Krueger flap mechanism 500 positioning the variable camber Krueger flap 306/502 in a barndoor position such as the barndoor position 602 providing an aerodynamically favorable position (task 906). As mentioned above the barndoor position 602 is an in-transit position, as the variable camber Krueger flap 306 is being deployed to the landing/takeoff detents. The barndoor position is an aerodynamically favorable position.

Process 900 may continue by the variable camber Krueger flap mechanism 500 positioning the variable camber Krueger flap 306/502 in a landing position such as the landing position 702 (task 908).

Process 900 may continue by the variable camber Krueger flap mechanism 500 positioning the variable camber Krueger flap 306/502 in a take-off position such as the take-off position 802 (task 910).

In this manner, the embodiments of the disclosure provide various means for configuring a camber of a fluid-dynamic body.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-8 depict example arrangements of elements, additional intervening elements, devices, features, or components may be present in an embodiment of the disclosure.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 310 to cause the processor module 310 to perform specified operations. Such instructions, generally referred to as "computer program code" or "program code" (which may be grouped in the form of computer programs or other groupings), when executed, enable variable camber Krueger flap mechanism 500 of the system 300.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A flap deployment linkage mechanism comprising:
a first linkage assembly operable to couple to a flap assembly and an airfoil, the first linkage assembly comprising:
a first drive arm coupled to the airfoil, and operable to rotate in a chord-wise plane;
a first drive link coupled to the first drive arm and a trailing end of the flap assembly; and
a support arm coupled to a middle link portion of the first drive link and rotatably coupled to the airfoil at a common joint;
a second linkage assembly operable to couple to the flap assembly and the airfoil, the second linkage assembly comprising:
a second drive arm rotatably coupled to the first drive arm;
a rotation control arm coupled to the second drive arm and the airfoil, and operable to control a rotation of the second drive arm;
a drive transfer arm coupled to a middle flap portion of the flap assembly and rotatably coupled to the airfoil at the common joint; and
a second drive link rotatably coupled to a middle transfer arm portion of the drive transfer arm and to the second drive arm; and
a flap linkage assembly operable to couple to the flap assembly, wherein:
the flap assembly comprises a bullnose member, a trailing end member, and a flexible surface coupled between the bullnose member and the trailing end member; and
the flap linkage assembly comprises:
a flap link coupled to the bullnose member, the trailing end member, and the first drive link;
a bullnose link coupled to the bullnose member and the first drive link; and
a transfer arm link coupled to the drive transfer arm, and the trailing end member.

2. The flap deployment linkage mechanism of claim 1, wherein the flap assembly is positioned in an elevated position relative to the airfoil to provide foreign object deflection protection for the airfoil.

3. The flap deployment linkage mechanism of claim 1, wherein the transfer arm link is further coupled to the flap link.

4. A method to enable natural laminar flow over a fluid-dynamic body using a variable camber Krueger flap mechanism, the method comprising:
deploying a sequence of flap positions where a variable camber Krueger flap is below and aft of a wing leading edge before reaching a configured takeoff and landing position; and
positioning the variable camber Krueger flap in a high position relative to the wing leading edge when the variable camber Krueger flap is fully deployed,
wherein:
the variable camber Krueger flap comprises a bullnose member, a trailing end member, and a flexible surface coupled between the bullnose member and the trailing end member; and
the variable camber Krueger flap mechanism is coupled to the wing leading edge and to the variable camber Krueger flap, and comprises:
a flap link coupled to the bullnose member, the trailing end member, and a first drive link;
a bullnose link coupled to the bullnose member and the first drive link;
a transfer arm link coupled to a drive transfer arm, the trailing end member;
a first drive arm coupled to the wing leading edge, and operable to rotate in a chord-wise plane, wherein the first drive link is coupled to the first drive arm and a trailing end of the flap assembly; and
a support arm coupled to a middle link portion of the first drive link and rotatably coupled to the airfoil at a common joint.

5. The method of claim 4, wherein the variable camber Krueger flap mechanism comprises a combined single joint deploying the variable camber Krueger flap.

6. The method of claim 4, further comprising positioning the variable camber Krueger flap in a barndoor position providing an aerodynamically favorable position.

7. The method of claim 4, further comprising positioning the variable camber Krueger flap in a landing position.

8. The method of claim 4, further comprising positioning the variable camber Krueger flap in a take-off position.

9. A flap linkage assembly operable to couple to an airfoil and to a flap assembly comprising a bullnose member, a trailing end member, and a flexible surface coupled between the bullnose member and the trailing end member, the flap linkage assembly comprising:
a flap link coupled to the bullnose member, the trailing end member, and a first drive link;
a bullnose link coupled to the bullnose member and the first drive link;
a transfer arm link coupled to a drive transfer arm, the trailing end member;
a first drive arm operable to couple to the airfoil, and to rotate in a chord-wise plane, wherein the first drive link is coupled to the first drive arm and a trailing end of the flap assembly; and
a support arm coupled to a middle link portion of the first drive link and rotatably coupled to the airfoil at a common joint.

10. The flap linkage assembly of claim 9, wherein the transfer arm link is further coupled to the flap link.

11. The flap linkage assembly of claim 9, wherein the flap assembly is further coupled to the airfoil.

12. The flap linkage assembly of claim 11, wherein the flap assembly is positioned in an elevated position relative to the airfoil to provide foreign object deflection protection for the airfoil.

13. The flap linkage assembly of claim 9, further comprising:
a second linkage assembly operable to couple to the flap assembly and the airfoil, the second linkage assembly comprising:
a second drive arm rotatably coupled to the first drive arm;
a rotation control arm coupled to the second drive arm and the airfoil, and operable to control a rotation of the second drive arm;
a drive transfer arm coupled to a middle flap portion of the flap assembly and rotatably coupled to the airfoil at the common joint; and
a second drive link rotatably coupled to a middle transfer arm portion of the drive transfer arm and to the second drive arm.

14. The flap linkage assembly of claim 11, wherein the airfoil comprises a wing and the flap assembly comprises a variable camber Krueger flap.

15. The flap linkage assembly of claim 14, wherein a sequence of flap positions are deployed where the variable camber Krueger flap is below and aft of the wing leading edge before reaching a configured takeoff and landing position.

16. The flap linkage assembly of claim 15, wherein the variable camber Krueger flap is positioned in a high position relative to the wing leading edge when the variable camber Krueger flap is fully deployed.

17. The flap linkage assembly of claim 16, wherein the variable camber Krueger flap enables natural laminar flow over the wing.

* * * * *